April 7, 1936.  F. MEYER  2,036,950

REGULATING THE FLOW OF FLUIDS

Filed May 9, 1934

F. Meyer
INVENTOR
By: Marks & Clerk
ATTYS.

Patented Apr. 7, 1936

2,036,950

UNITED STATES PATENT OFFICE 2,036,950

REGULATING THE FLOW OF FLUIDS

Felix Meyer, Aachen, Germany

Application May 9, 1934, Serial No. 724,802
In Germany May 19, 1933

1 Claim. (Cl. 137—68)

This invention relates to apparatus in which in a known manner a liquid flows freely out of a pipe into a vessel which has an outlet aperture at the bottom and which is suspended from a scale beam balanced by a counterpoise. In such apparatus the vessel assumes different positions according to the quantity discharged, as in the case of scales used for weighing, substantial oscillations of the vessel commonly occurring when it moves to a new position of equilibrium.

Now the present invention relates to apparatus of this kind, for regulating the flow of liquids, wherein, when the quantity flowing varies, the transition of the weighing apparatus from one position of equilibrium to another takes place without oscillations, owing to means being provided for damping such oscillations.

Figure 1:
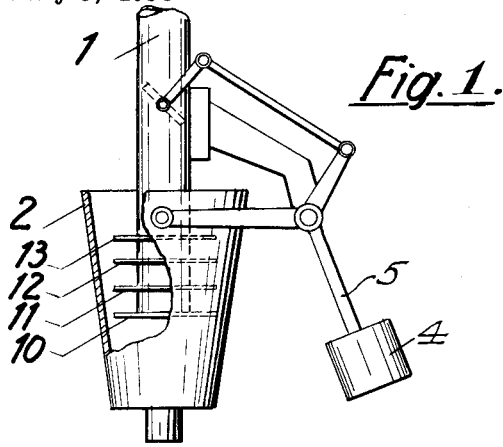
Figure 2:
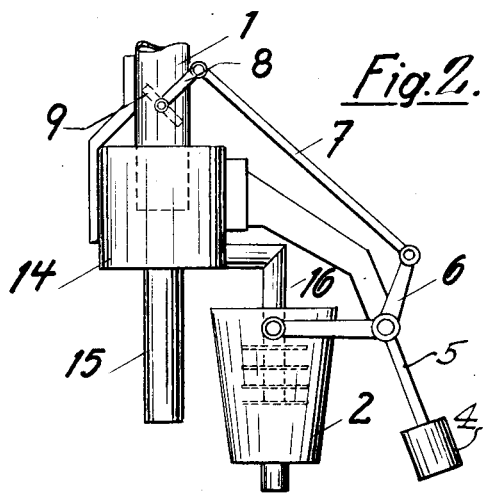

The invention is illustrated by way of example in the accompanying drawing, in which Figure 1 shows apparatus for regulating a liquid discharge to a constant quantity, Figure 2 illustrates apparatus similar to that of Figure 1 for large flows, wherein however only a portion of the liquid flows through the vessel.

The liquid flowing out of a pipe 1 flows into a vessel 2, which has an outlet 3 underneath. The scale beam 5 carrying a counterpoise 4 is at right angles or approximately at right angles to the scale beam carrying the vessel. The scale beam 5 is connected by levers 6 and 8 and a link 7 with a throttle valve 9, so that as the vessel descends the throttling is increased, whereas when the vessel ascends the throttling is diminished, a constant flow therefore adjusting itself.

Now according to the invention the inlet pipe 1 of the liquid here extends into the vessel 2, so that it dips partly into the liquid contained therein. Upon the tube 1, at the lower end, are fitted a number of parallel thin plates 10, 11, 12 and 13 a short distance apart, these plates being of such a diameter that in an immersed condition they are so far from the wall of the vessel that their ascent and descent in the liquid does not produce any appreciable braking effect. They are so arranged that about half of them, for instance the plates 10 and 11, are wholly immersed during normal operation, while the others, 12 and 13 for example, are entirely clear of the liquid. Now if a sudden pulsation or oscillation occurs the plate 12 strikes the surface of the liquid with considerable force, thereby producing a marked braking effect. This braking action is instantaneous, for as soon as the plate is immersed in the liquid the braking effect no longer acts. It also does not when the immersion takes place quite slowly during normal operation.

Figure 2 shows a form of construction of the invention for large flows, in which only a portion of the liquid passes through the vessel. The supply tube 1 opens into a container 14 rigidly connected with it, which has an outlet 15 underneath and an outlet 16 at the side. The lateral pipe 16 opens into the vessel 2, which shifts, by means of the levers 6 and 8 and the link 7 the throttle valve 9, which regulates the total quantity flowing. The pipe 16 carries a number of plates 10, 11, 12, 13 to prevent pulsations and oscillations, as described above with reference to Figure 1.

What I claim is:—

Means for regulating varying quantities of liquid flowing freely out of a pipe, comprising a vessel adapted to receive the liquid as it flows out of the pipe, the mouth of the said pipe extending down into the vessel, the vessel being formed with a discharge aperture, a scale-beam carrying the vessel, means for counter-balancing the weight of the vessel and liquid throttling means in the pipe out of which the liquid flows, mechanism actuated by the scale-beam for partially closing the throttling means when the vessel sinks and for opening the throttling means wider when the vessel rises, at least two horizontal thin plates carried by the pipe where it extends down into the vessel, the diameters of the plates being substantially less than the internal diameter of the vessel, and the plates being so arranged that when the vessel is in its normal position at least one of the plates is wholly immersed in the liquid contained therein and at least one is wholly above the surface of the liquid.

FELIX MEYER.